United States Patent
Ohta et al.

(10) Patent No.: US 9,849,547 B2
(45) Date of Patent: Dec. 26, 2017

(54) MANUFACTURING APPARATUS AND MANUFACTURING METHOD FOR MANUFACTURING LESS UNBALANCED BLOWER BLADE

(71) Applicant: FANUC CORPORATION, Minamitsuru-gun, Yamanashi (JP)

(72) Inventors: Kazuya Ohta, Yamanashi (JP); Satoru Kawai, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/753,793

(22) Filed: Jun. 29, 2015

(65) Prior Publication Data
US 2015/0375347 A1    Dec. 31, 2015

(30) Foreign Application Priority Data

Jun. 30, 2014    (JP) ................ 2014-135186

(51) Int. Cl.
| | |
|---|---|
| B23P 15/02 | (2006.01) |
| G01M 1/34 | (2006.01) |
| B23C 3/18 | (2006.01) |
| F04D 29/66 | (2006.01) |
| F04D 29/02 | (2006.01) |
| F04D 17/16 | (2006.01) |

(52) U.S. Cl.
CPC ............ B23P 15/02 (2013.01); B23C 3/18 (2013.01); F04D 17/16 (2013.01); F04D 29/023 (2013.01);
(Continued)

(58) Field of Classification Search
CPC ........... F01D 5/027; G01M 1/34; F16F 15/32; B23C 3/18; B23C 2215/12;
(Continued)

(56) References Cited

U.S. PATENT DOCUMENTS

| | | | |
|---|---|---|---|
| 4,482,963 | A | 11/1984 | Lenahan |
| 2013/0334184 | A1 | 12/2013 | Liu |
| 2015/0346714 | A1 | 12/2015 | Takahashi et al. |

FOREIGN PATENT DOCUMENTS

| | | |
|---|---|---|
| CN | 103029310 | 4/2013 |
| CN | 103582764 | 2/2014 |

(Continued)

OTHER PUBLICATIONS

Translation of JP 2012037409 A, generated Nov. 18, 2016.*
(Continued)

*Primary Examiner* — Christopher Besler
*Assistant Examiner* — Matthew P Travers
(74) *Attorney, Agent, or Firm* — RatnerPrestia

(57) ABSTRACT

A manufacturing apparatus for manufacturing a blower blade including a plurality of blade portions having the same shape and arranged around a rotation axis line includes a machining device for machining the blower blade and a control device for controlling the machining device. The control device includes a command creation unit for creating an operation command to the machining device according to a machining program and a machining parameter, a balance measurement unit for measuring balance of the blower blade, and a machining amount adjustment unit configured to individually adjust a machining amount of each of the blade portions without changing the machining program, based on data of the balance of the blower blade measured by the balance measurement unit so as to reduce unbalance of the blower blade. A manufacturing method using the above-described manufacturing apparatus is also provided.

7 Claims, 8 Drawing Sheets

(52) U.S. Cl.
CPC ............ *F04D 29/662* (2013.01); *G01M 1/34* (2013.01); *F05D 2230/14* (2013.01); *Y10T 29/37* (2015.01); *Y10T 29/49325* (2015.01); *Y10T 29/49774* (2015.01)

(58) Field of Classification Search
CPC ........ B23C 2215/44; B23C 2215/52–2215/56; B23C 2220/48; B23P 15/006; B23P 15/02; B23Q 15/14; B23Q 17/0923; B23Q 17/2266–17/2275; B23Q 15/24; B23Q 15/22; B23Q 15/12; F05D 2230/18; F05D 2230/00–2230/14; Y10T 29/37; Y10T 29/49316; Y10T 29/49325; Y10T 29/49327; Y10T 29/49329; Y10T 29/49332; Y10T 29/49764; Y10T 29/49771; Y10T 29/49774; Y10T 29/49778

See application file for complete search history.

(56) References Cited

FOREIGN PATENT DOCUMENTS

| | | | | |
|---|---|---|---|---|
| EP | 1239059 | 9/2002 | | |
| JP | 58180928 | 10/1983 | | |
| JP | 07299697 | 11/1995 | | |
| JP | 09201723 | 8/1997 | | |
| JP | 11231914 | 8/1999 | | |
| JP | 2002-371863 | 12/2002 | | |
| JP | 2003302304 | 10/2003 | | |
| JP | 2006-235776 | 9/2006 | | |
| JP | 2012037409 A | * | 2/2012 | ............ G01M 1/34 |
| JP | 2012093250 A | * | 5/2012 | ............ G01M 1/34 |
| JP | 2013-15432 A | | 1/2013 | |
| JP | 5456208 | | 3/2014 | |

OTHER PUBLICATIONS

Translation of JP 2012093250 A, generated Nov. 18, 2016.*
Translation of JP2013015432, cited in IDS; generated Nov. 16, 2016.*
Roessner, W., "Lecture: Werkzeugmaschinen/NC. Augsburg: Univ. of Augsburg, Faculty of mechanical engineering URL: http://docplayer.org/2549032-Vorlesung-werkzeugmaschinin-nc.html#download tab content [Last accessed on Sep. 22, 2016]," 111 pages, with Concise Statement of Explanation.
Second Office Action dated Oct. 31, 2016 for Chinese Application No. 201510231074.0, including English translation, 11 pages.

* cited by examiner

MANUFACTURING APPARATUS AND MANUFACTURING METHOD FOR MANUFACTURING LESS UNBALANCED BLOWER BLADE

BACKGROUND ART

1. Technical Field

The present invention relates to a manufacturing apparatus and a manufacturing method for manufacturing a blower blade.

2. Description of the Related Art

There is a need for a blower which can rotate at a high speed with the aim of downsizing and performance improvement of the blower. When the blower rotates at a high speed, balance of a blower blade is important. An amplitude of vibration during operation may sometimes need to be less than one micrometer. However, producing such a less unbalanced blower blade using a machining jig is technically very challenging, and thus cost tends to increase.

A method has been proposed in which a blower blade is first produced without requiring strict balance, and the balance of the blower blade is measured in order to shape the blower blade later according to the measured result. For example, JP 2013-015432 A, and JP 2002-371863 A disclose methods for reducing unbalance of blade cascades of a rotary machine. JP 2006-235776 A discloses a method for reducing a machining error by changing machining data for determining a cutting position, depending on a wear amount of a cutting tool.

However, the methods described in JP 2013-015432 A and JP 2002-371863 A take a considerable effort and time to improve the balance. According to the machining method described in JP 2006-235776 A, it is necessary to acquire data indicating a relationship between a wear amount and a dimensional error of a cutting tool and change a coordinate position in numerical control (NC) data based on the acquired data, and therefore it is difficult to realize the method.

As described above, the conventional techniques require extensive effort or cost to manufacture a less unbalanced blower blade. Thus, there is a need for a manufacturing apparatus and a manufacturing method which can manufacture a less unbalanced blower blade with a simple method.

SUMMARY OF THE INVENTION

According to a first aspect of the present invention, there is provided a manufacturing apparatus for manufacturing a blower blade in which a plurality of blade portions having a same shape are arranged around a rotation axis line, the manufacturing apparatus comprising a machining device configured to machine the blower blade and a control device configured to control the machining device, wherein the control device comprises: a command creation unit configured to create an operation command to the machining device according to a machining program and a machining parameter; a balance measurement unit configured to measure balance of the blower blade; and a machining amount adjustment unit configured to individually adjust a machining amount of each of the blade portions without changing the machining program, based on data of the balance of the blower blade measured by the balance measurement unit, so as to reduce unbalance of the blower blade.

According to a second aspect of the present invention, in the manufacturing apparatus according to the first aspect, the machining amount adjustment unit individually adjusts the machining parameter of each of the blade portions to adjust the machining amount.

According to a third aspect of the present invention, in the manufacturing apparatus according to the second aspect, the machining parameter adjusted by the machining amount adjustment unit is a parameter associated with a tool length of the machining device.

According to a fourth aspect of the present invention, in the manufacturing apparatus according to the second aspect, the machining parameter adjusted by the machining amount adjustment unit is a parameter associated with a tool diameter of the machining device.

According to a fifth aspect of the present invention, in the manufacturing apparatus according to the second aspect, the machining parameter adjusted by the machining amount adjustment unit is a parameter associated with a program coordinate system of the machining program.

According to a sixth aspect of the present invention, in the manufacturing apparatus according to the second aspect, the machining parameter adjusted by the machining amount adjustment unit is a parameter associated with a workpiece coordinate system of the machining program.

According to a seventh aspect of the present invention, there is provided a manufacturing method for manufacturing a blower blade in which a plurality of blade portions having a same shape are arranged around a rotation axis line, the manufacturing method comprising: measuring balance of the blower blade; and individually adjusting a machining amount of each of the blade portions without changing the machining program, based on data of the measured balance of the blower blade so as to reduce unbalance of the blower blade.

According to an eighth aspect of the present invention, in the manufacturing method according to the seventh aspect, the machining amount of each of the blade portions is adjusted by adjusting the machining parameter.

These and other objects, features and advantages of the present invention will become more apparent in light of the detailed description of exemplary embodiments thereof as illustrated in the drawings.

DETAILED DESCRIPTION OF THE INVENTION

Figure 1:
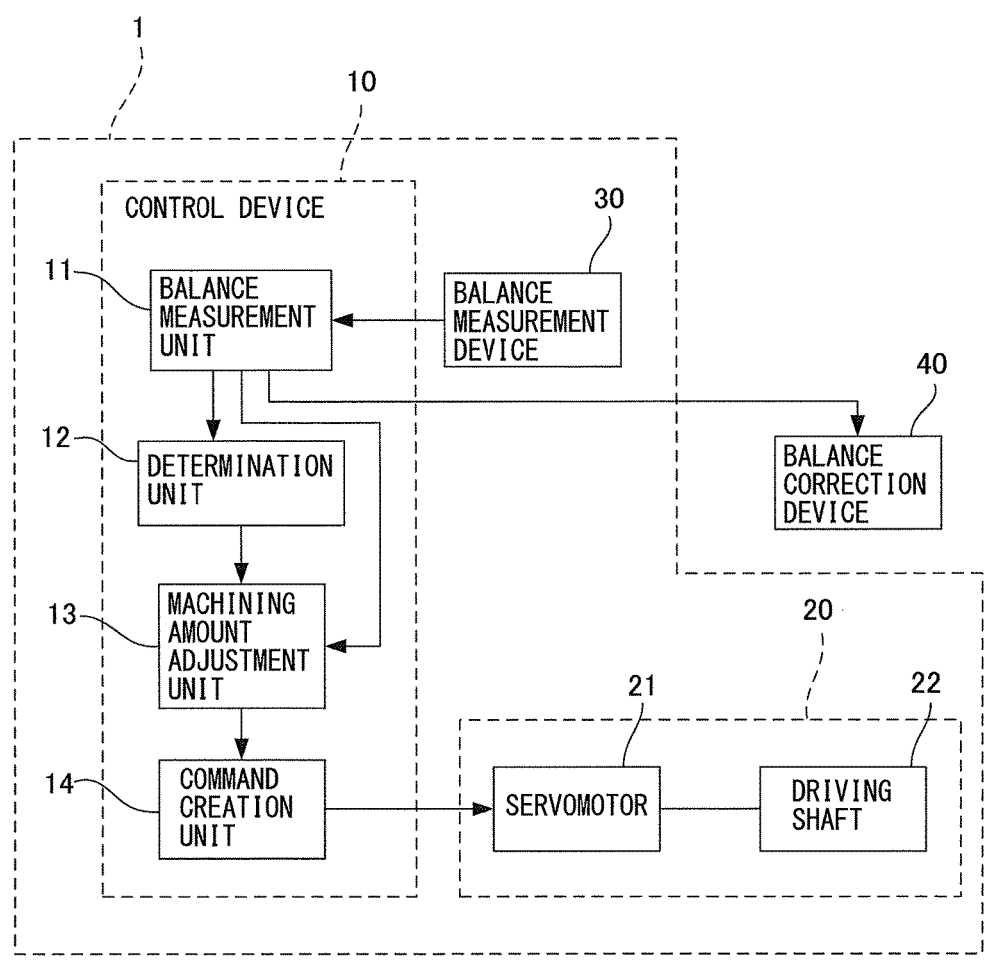
FIG. 1 is a function block diagram of a manufacturing apparatus according to one embodiment.

Embodiments of the present invention will be described in detail below with reference to the drawings. Scales of the drawings have been changed as necessary to facilitate understanding of the present invention. Identical or corresponding components are denoted by the same reference numeral.

FIG. 1 is a function block diagram of a manufacturing apparatus 1 according to one embodiment. The manufacturing apparatus 1 includes a machining device 20 which machines a blower blade and a control device 10 which controls a drive shaft 22 of the machining device 20. The machining device 20 has a known configuration including a plurality of drive shafts 22. The machining device 20 is, for example, a machining center to be used for forming a blower blade from a workpiece by machining, such as cutting and grinding. The machining device 20 includes servomotors 21 provided for each of the drive shafts 22 to apply a driving force to the drive shafts 22. The control device 10 supplies predetermined electric power to the servomotor 21 to control the machining device 20.

The manufacturing apparatus 1 further includes a balance measurement device 30 having a known configuration. The balance measurement device 30 measures balance of a blower blade based on, for example, a detected angle detected by a rotation angle detector and vibration data detected by a vibration detector. The balance measurement device 30 is configured to detect an unbalance amount and a rotation angle position where the unbalance exists.

In FIG. 1, a balance correction device 40 is illustrated together with the manufacturing apparatus 1. The balance correction device 40 is used in a post-process to correct balance of the blower blade manufactured by the manufacturing apparatus 1. The balance correction device 40 is, for example, a grinder controlled by the control device 10 or another control device (not illustrated) different from the control device 10. Alternatively, the balance correction device 40 may be a machine directly operated by an operator, such as a hand drill.

The control device 10 is a digital computer having a known hardware configuration, for example, including a central processing unit (CPU) executing various calculations, a random access memory (RAM) temporarily storing calculation results, a read-only memory (ROM) storing a machining program and the like, an input device such as a keyboard or mouse used for inputting setting values such as a machining parameter, and a display device, such as a liquid crystal display, displaying various pieces of information. As illustrated in FIG. 1, the control device 10 includes a balance measurement unit 11, a determination unit 12, a machining amount adjustment unit 13, and a command creation unit 14.

The command creation unit 14 creates an operation command to the servomotors 21 of the machining device 20 based on a machining program to be executed and a machining parameter input by, for example, an operator. The operation command may include a position command and a speed command, but is not limited to thereto. The machining device 20 performs machining on a blower blade in accordance with the operation command input from the command creation unit 14.

Figure 2:
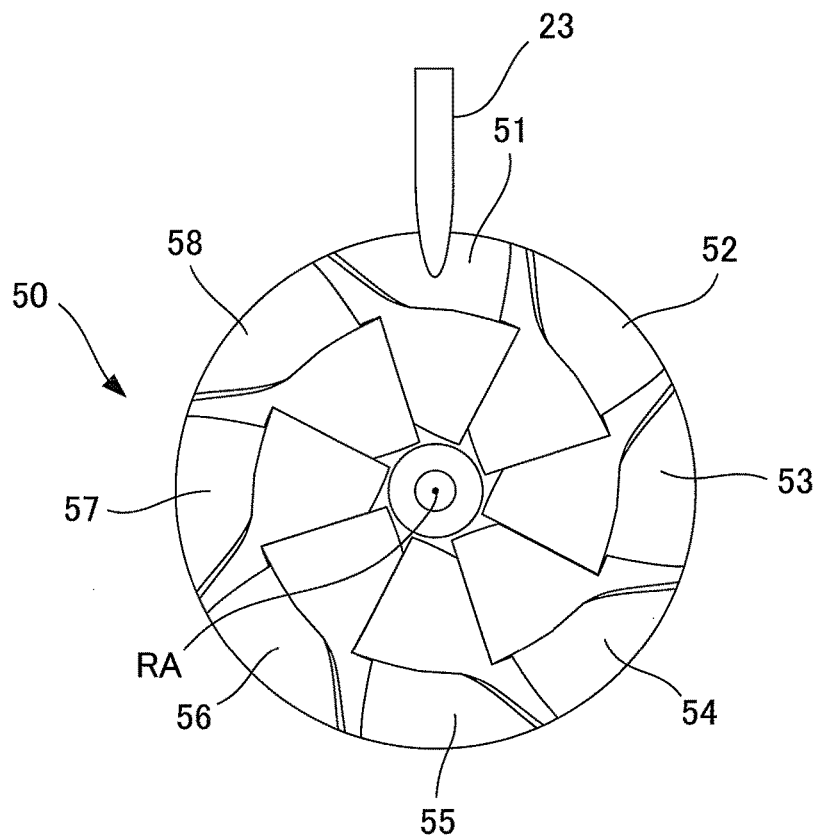
FIG. 2 illustrates an exemplary configuration of a blower blade.

FIG. 2 illustrates an exemplary configuration of the blower blade. The blower blade 50 illustrated in FIG. 2 includes eight blade portions 51 to 58 which are arranged and equally spaced apart from each other around a rotation axis line RA. The blade portions 51 to 58 have the same shape with each other, and the blower blade 50 has a rotational symmetric shape around the rotation axis line RA. The machining device 20 executes a machining process according to the same machining program while rotating the blower blade 50 every 45 degrees, in order to form the blade portions 51 to 58 successively. The present invention will be described below by using the illustrated blower blade 50 as an example. However, it is noted that the number and shape of the blade portions are not limited to the illustrated specific example.

The balance measurement unit 11 measures balance of the blower blade 50 by the balance measurement device 30. The measured balance data of the blower blade 50 is output to the determination unit 12 and the machining amount adjustment unit 13. In addition, if the balance correction device 40 used in the post-process is controlled by the control device 10, the balance data of the blower blade 50 is output to the balance correction device 40 as well. The balance data of the blower blade 50 may be displayed on a display device in order to allow an operator to easily check it.

Figure 3A:
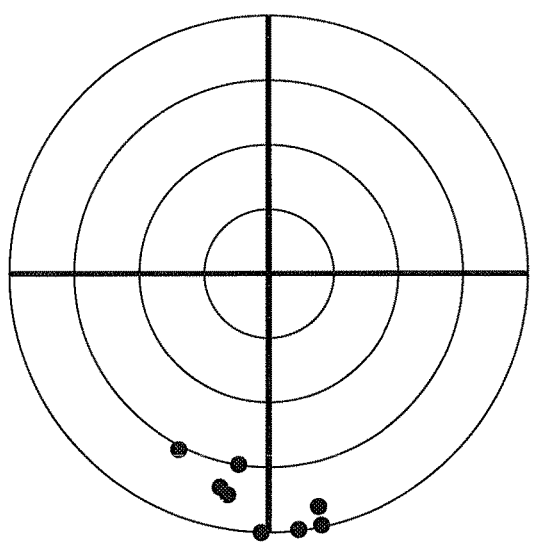
FIG. 3A illustrates an example of a balance measurement result before balance correction.

FIG. 3A illustrates an example of balance measurement results of the blower blade 50 by the balance measurement device 30. Each black dot in the drawing indicates an unbalance amount and an angle position where the unbalance exists. Each radius of concentric circles indicates an unbalance amount, and a greater radius represents a larger unbalance amount. For example, a black dot on a circumference of the outermost circle indicates that 100 mg of unbalance exists at its angle position. Also referring to FIG. 2, in the illustrated example, it can be understood that unbalance concentrically exists at the angle positions of the blade portion 55 in lower part of the drawing.

Returning back to FIG. 1, the determination unit 12 of the control device 10 determines whether or not an unbalance amount measured by the balance measurement unit 11 is within a predetermined allowable range. The allowable range is determined as necessary, depending on the required balance accuracy. According to the present embodiment, if the determination unit 12 determines that the unbalance amount falls outside the allowable range, a control signal is input to the machining amount adjustment unit 13, and a balance correction process is to be executed.

The machining amount adjustment unit 13 individually adjusts a machining amount for each of the blade portions 51 to 58 which is necessary for correcting the balance, based on the balance measurement result. For example, in the case of the measurement result in FIG. 3A, the machining amount is adjusted so that the machining amount for the blade portion 55 becomes greater than those of the remaining blade portions 51 to 54 and 56 to 58.

According to the present embodiment, the machining amount adjustment unit 13 adjusts a machining parameter to adjust the machining amount of each of the blade portions 51 to 58, as described in detail below. Then, the command creation unit 14 creates an operation command to the machining device 20 based on the machining parameter adjusted by the machining amount adjustment unit 13 and a predetermined machining program. As a result, the blade portions 51 to 58 are each shaped by the machining device 20 according to the machining amount individually allocated thereto.

Figure 3B:
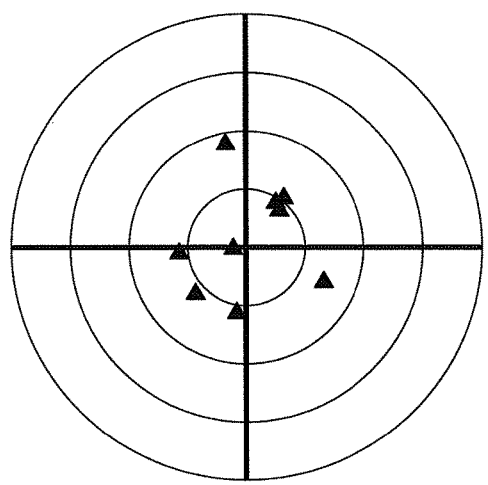
FIG. 3B illustrates an example of a balance measurement result after balance correction.

FIG. 3B illustrates balance of the blower blade 50 measured after shaping the blower blade 50 according to the machining amounts adjusted for each of the blade portions 51 to 58, or in other words after executing balance correction. Each black triangle in the drawing indicates an unbalance amount and an angle position which the unbalance exists, similarly to the black dots in FIG. 3A. When comparing FIG. 3A with FIG. 3B, it can be understood that every black triangle is positioned closer to the center of the circle, indicating that unbalance is reduced after the balance correction.

Exemplary methods to adjust a machining amount will be described with reference to FIGS. 4A to 7. According to the present embodiment, the machining parameter is adjusted individually for each of the blade portions 51 to 58, in order to adjust the machining amount of each of the blade portions 51 to 58. For convenience, only machining performed with respect to an XZ plane including an X axis and a Z axis will be considered in the following examples. In addition, in order to facilitate the understanding, positions of program trajectories T and T', program origins P and P', and workpiece origins WP and WP' are changed accordingly.

Figure 4A:
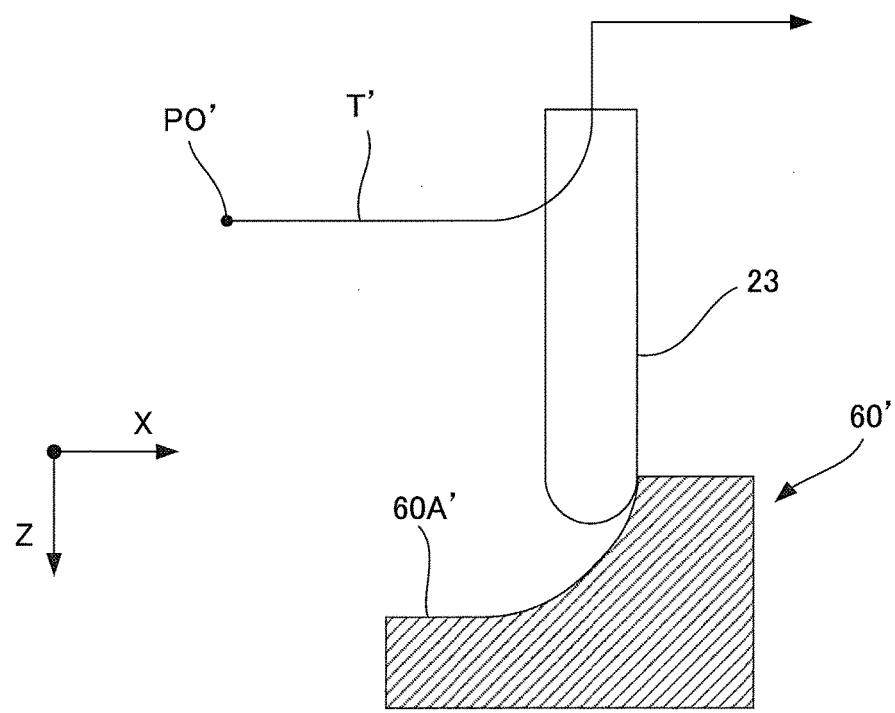
FIG. 4A illustrates an example of an adjustment method of a machining amount.

An example will be described with reference to FIGS. 4A and 4B, in which a machining parameter associated with a tool length of the machining device 20 is adjusted. FIG. 4A illustrates a workpiece 60' having a machined surface 60A' which is formed by executing a machining program without adjusting the machining parameter. A tool 23 moves along a program trajectory T' having a starting point at a program origin PO' while rotating about a rotation axis line extending in a longitudinal direction, so that the machined surface 60A' is formed.

Figure 4B:
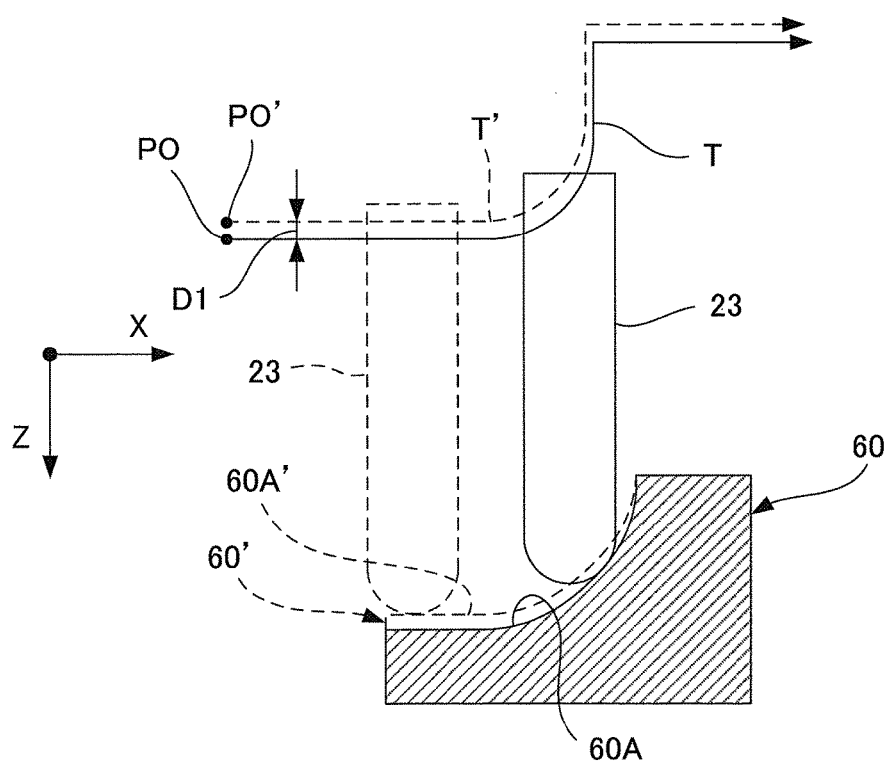
FIG. 4B illustrates an example of an adjustment method of a machining amount.

FIG. 4B illustrates a workpiece 60 which is formed when the machining parameter is adjusted so that a setting value of the tool length to be considered in creation of an operation command to the machining device 20 becomes shorter than an actual tool length. In this case, the tool 23 moves along a program trajectory T having a starting point at a program origin PO to form a machined surface 60A. In FIG. 4B, the workpiece 60', the program trajectory T', and the tool 23 in the middle of machining process in the case of the machining parameter not being adjusted (i.e., in the case of FIG. 4A) are also illustrated in dashed lines for comparison.

It can be seen from FIG. 4B that the program trajectory T drawn by a solid line is moved from the program trajectory T' by a difference D1 between the setting value of the tool length and the actual tool length. In this case, the machining parameter is set so as to shorten the tool length than the actual length, and thus, the program trajectory T is changed and moved closer to the workpiece 60. As a result, as illustrated in FIG. 4B, a machining amount of the workpiece 60 is increased compared with the case when the machining parameter is not adjusted.

In contrast to the example in FIG. 4B, if the machining parameter is adjusted so that the setting value of the tool length becomes greater than the actual tool length, the program trajectory T is changed to move away from the workpiece 60. As a result, it can be understood that the machining amount of the workpiece 60 is decreased compared with the case when the machining parameter is not adjusted.

Figure 5A:
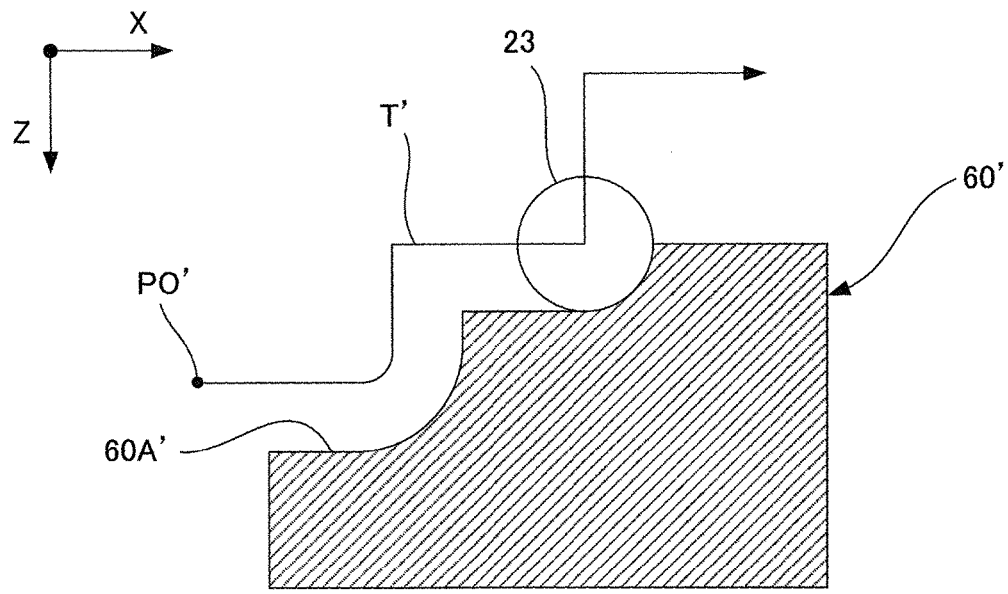
FIG. 5A illustrates an example of an adjustment method of a machining amount.

An example will be described with reference to FIGS. 5A and 5B, in which machining parameter associated with a tool diameter of the machining device 20 is adjusted. FIG. 5A illustrates the workpiece 60' having a machined surface 60A' which is formed by executing the machining program without adjusting the machining parameter. The tool 23 moves along the program trajectory T' having a starting point at the program origin PO', to form the machined surface 60A'.

Figure 5B:
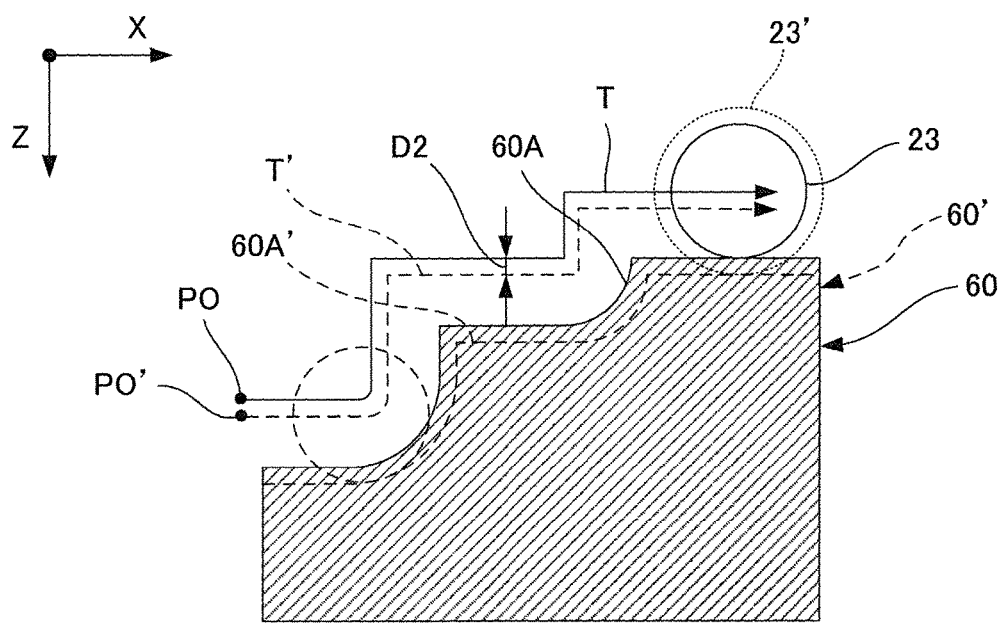
FIG. 5B illustrates an example of an adjustment method of a machining amount.

FIG. 5B illustrates a workpiece 60 which is formed when the machining parameter is adjusted so that a setting value of the tool diameter becomes greater than an actual tool diameter. In this case, the tool 23 moves along a program trajectory T having a starting point at the program origin PO, to form a machined surface 60A. In FIG. 5B, the workpiece 60' in the case of the machining parameter being not adjusted (in the case of FIG. 5A), the tool 23 in the middle of machining, and a virtual tool 23' having a setting tool diameter greater than the actual tool diameter are illustrated in dashed lines for comparison.

It can be seen from FIG. 5B that the program trajectory T drawn by a solid line is moved from the program trajectory T' by a half (D2) of a difference between the setting value of the tool diameter and the actual tool diameter. In this case, the machining parameter is set so as to allow the tool diameter to be greater than the actual diameter, and thus the program trajectory T is changed to move away from the workpiece 60. As a result, as illustrated in FIG. 5B, the machining amount of the workpiece 60 is decreased compared with the case when the machining parameter is not adjusted.

In contrast to the example in FIG. 5B, if the machining parameter is adjusted so that the setting value of the tool diameter becomes greater than the actual tool diameter, the program trajectory T is changed to move closer to the workpiece 60. As a result, it can be understood that the machining amount of the workpiece 60 is increased compared with the case when the machining parameter is not adjusted.

Figure 6:
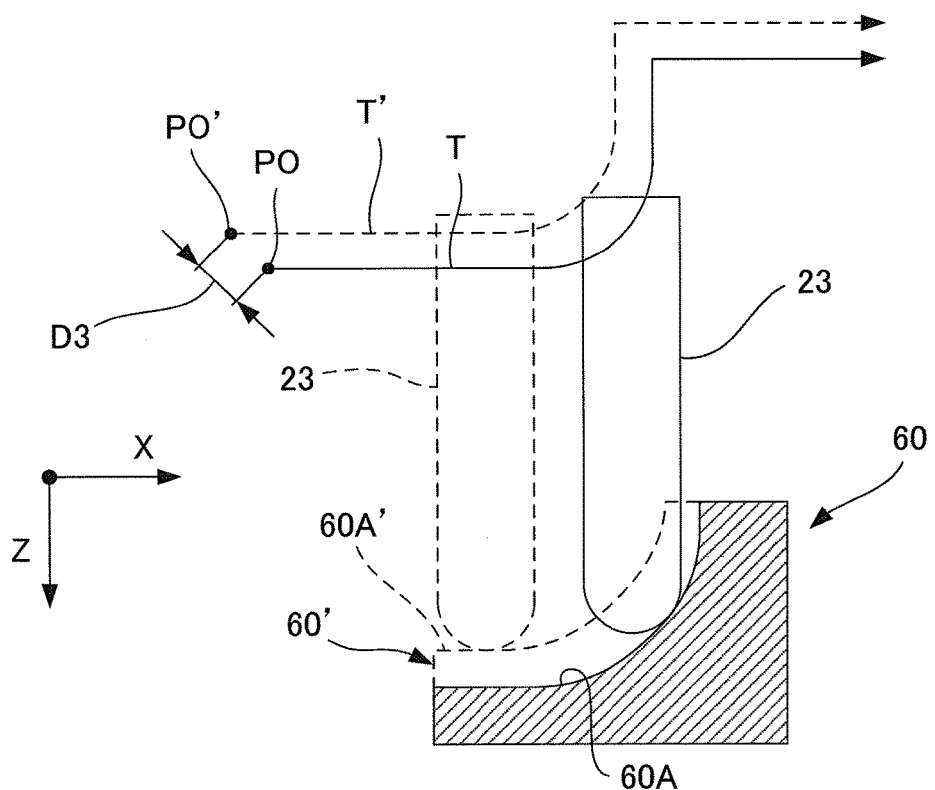
FIG. 6 illustrates an example of an adjustment method of a machining amount.

Referring to FIG. 6, an example will be described in which machining parameter associated with a program coordinate system is adjusted. Specifically, the machining parameter is adjusted to change a program origin. In FIG. 6, "PO'" represents a program origin when the machining parameter is not adjusted, while "PO" represents a program origin after the machining parameter is adjusted. In the illustrated example, the program origin PO is moved by a difference D3 to a direction toward the workpiece 60. As a result, as can be seen in comparison with the workpiece 60' in the case of the machining parameter being not adjusted, the machining amount of the workpiece 60 is increased with the adjusted machining parameter.

In contrast to the example in FIG. 6, when the machining parameter is adjusted such that the program origin PO is moved away from the workpiece 60, the program trajectory T is changed to move away from the workpiece 60. As a result, it can be understood that the machining amount of the workpiece 60 is decreased compared with the case when the machining parameter is not adjusted.

Figure 7:
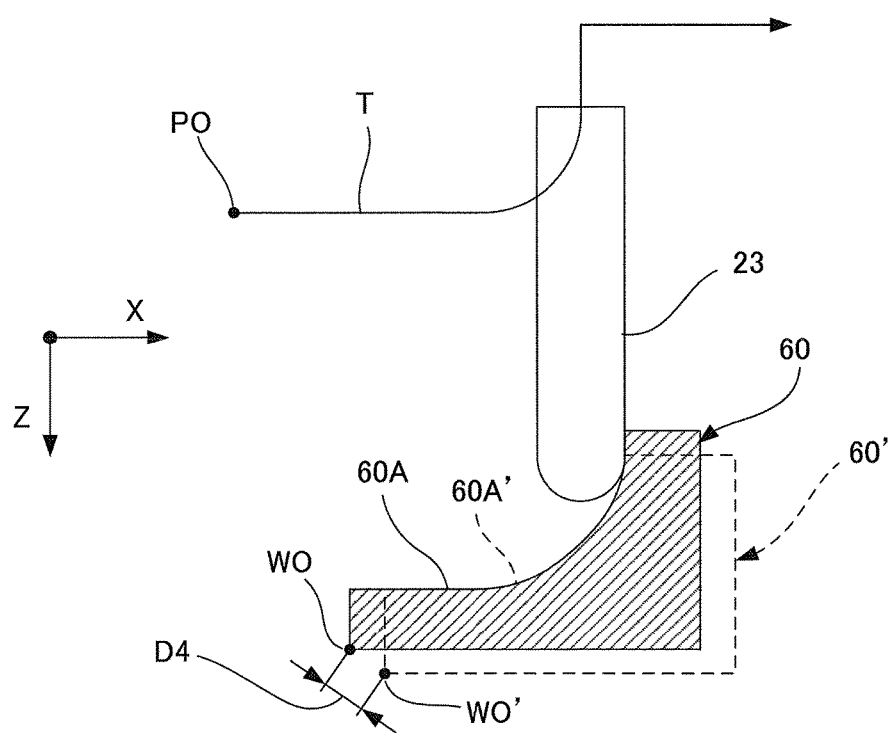
FIG. 7 illustrates an example of an adjustment method of a machining amount.

Referring to FIG. 7, an example will be described in which machining parameter associated with a workpiece coordinate system is adjusted. Specifically, the machining parameter is adjusted to change an origin of the workpiece coordinate system. In FIG. 7, "WO'" represents a workpiece origin when the machining parameter is not adjusted, while "WO" represents a workpiece origin after the machining parameter is adjusted. In the illustrated example, the workpiece origin WO is moved by a difference D4 in a direction toward the tool 23. As a result, as can be seen in comparison with the workpiece 60' in the case of the machining parameter not being adjusted, the machining amount of the workpiece 60 is increased with the adjusted machining parameter.

In contrast to the example in FIG. 7, it can be understood that when the machining parameter is adjusted to move the workpiece origin WO away from the tool 23, the machining amount of the workpiece 60 is decreased compared with the case when the machining parameter is not adjusted.

The above-described adjustment of the machining parameter is executed for each of the blade portions 51 to 58 of the blower blade 50 based on the measurement result of the balance. In this way, the machining amount can be individually adjusted for each of the blade portions 51 to 58 of the blower blade 50 without changing the machining program, by properly adjusting the machining parameter. For example, a relationship between a measured unbalance amount of the blower blade and a machining amount adjusted based on the measured unbalance amount can be calculated by using a three-dimensional model of the blower blade 50, or alternatively, empirically obtained by repeatedly executing adjustment of the machining amount and measurement of the balance.

Figure 8:
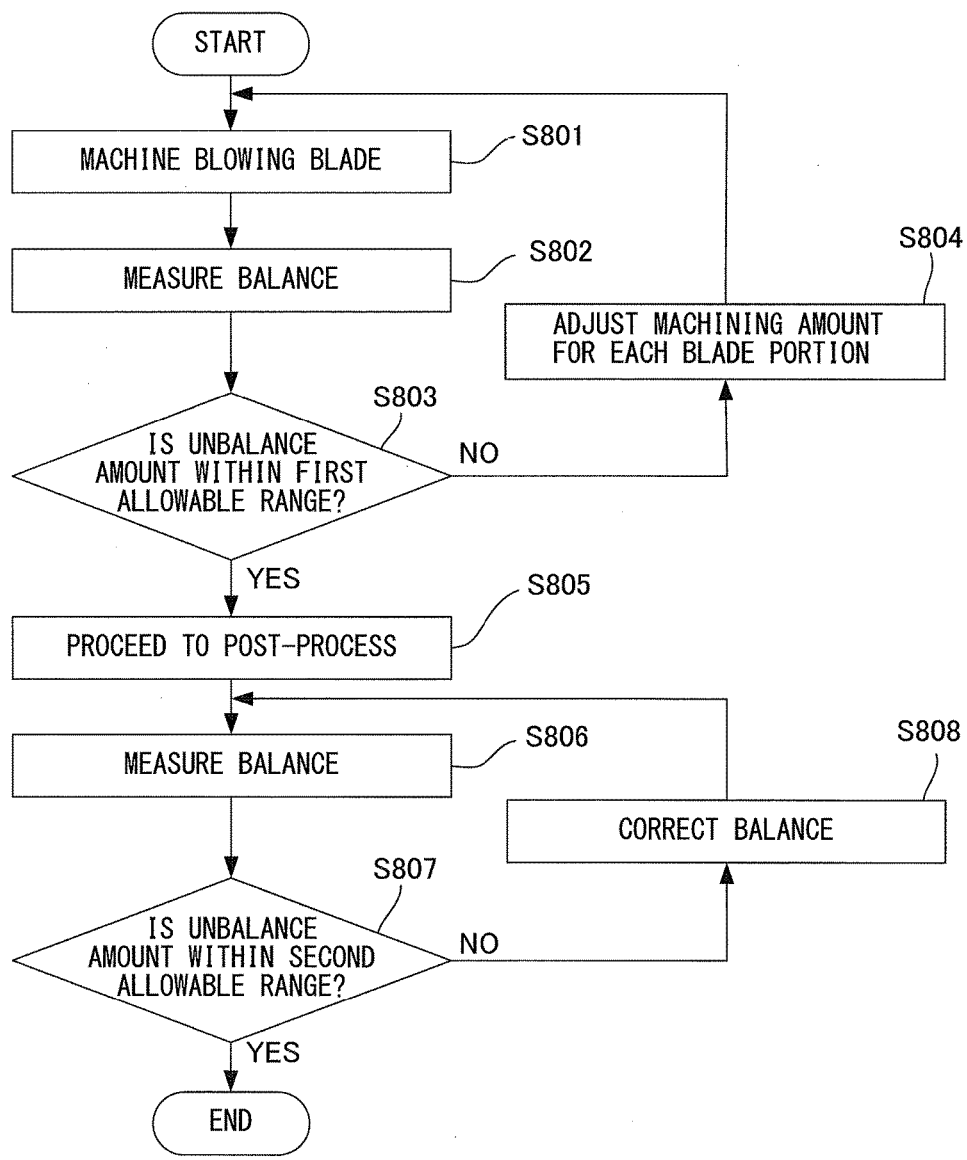
FIG. 8 is a flowchart illustrating a process flow of a manufacturing method according to one embodiment.

Next, a manufacturing method for manufacturing the blower blade 50 according to the present embodiment is described with reference to FIG. 8. FIG. 8 is a flowchart illustrating a process flow of the manufacturing method. According to the manufacturing method described by way of example, after the blower blade 50 is formed by using the control device 10 according to the above-described embodiment, balance correction is executed in the post-process if needed. However, the post-process may be omitted, depending on the required accuracy.

At step S801, the command creation unit 14 creates an operation command based on a predetermined machining program and machining parameters, in order to machine a blower blade 50 by the machining device 20.

At step S802, the balance measurement unit 11 measures the balance of the blower blade 50 by the balance measurement device 30.

At step S803, the determination unit 12 determines whether or not an unbalance amount of the blower blade 50 is within a first allowable range. For example, if an unbalance amount at any angle position measured at step S802 exceeds a predetermined threshold value, the determination unit 12 determines that the unbalance amount is out of the first allowable range.

If the result of the determination at step S803 is negative, the process proceeds to step S804, at which the machining amount adjustment unit 13 individually adjusts the machining amounts of the blade portions 51 to 58 of the blower blade 50 in accordance with the measured unbalance amount. For example, the machining amount is adjusted so that the machining amount of the unbalanced blade portion (e.g., the blade portion 55) becomes greater than the machining amounts of the other blade portions (e.g., the blade portions 51 to 54 and 56 to 58). Alternatively, the machining amount is adjusted so that the machining amount of the blade portion (e.g., the blade portion 51) located on an opposite side of the unbalanced blade portion (e.g., the blade portion 55) becomes smaller than the machining amounts of the other blade portions (e.g., the blade portions 52 to 58). The machining amount adjustment unit 13 adjusts the machining parameter, such as the tool length, the tool diameter, the program origin, and the workpiece origin as described above, in order to adjust the machining amount.

Next, the process returns to step S801, at which the machining device 20 machines again the blade portions 51 to 58 of the blower blade 50 according to the machining amounts adjusted at step S804. The processes at steps S801 to S804 are repeated until the result of the determination at step S803 becomes positive.

When the result of the determination at step S803 is positive, it can be assumed that the blower blade 50 is formed with sufficient accuracy in balance. Then, the process proceeds to step S805, at which the post-process for reducing the remaining minute unbalance.

In the post-process, at step S806, the balance measurement unit 11 measures the balance of the blower blade 50 by the balance measurement device 30.

At step S807, the determination unit 12 determines whether or not the unbalance amount measured at step S806 is within a second allowable range. The second allowable range is defined as necessary according to the required balance characteristic, similarly to the first allowable range. However, the second allowable range is defined so that the determination is stricter than in the case of the first allowable range.

When the result of the determination at step S807 is positive, it can be assumed that the blower blade 50 satisfies the balance characteristic required for a finished product, and the manufacturing process of the blower blade 50 is completed.

On the other hand, when the result of the determination at step S807 is negative, the process proceeds to step S808, at which the balance correction device 40 corrects the balance of the blower blade 50 in accordance with the unbalance amount measured at step S806. Next, the process proceeds to step S806, at which the unbalance amount is measured again. The processes at step S806 to S808 are repeated until the result of the determination at step S807 becomes positive.

The manufacturing apparatus and the manufacturing method according to the present embodiment can provide the following advantages.

(1) According to the manufacturing apparatus 1, the machining parameter is adjusted so that the machining amounts of the blade portions 51 to 58 are individually adjusted in order to correct the balance of the blower blade 50. In other words, the identical machining program is executed at every 45 degrees to adjust the machining amount of each of the blade portions 51 to 58 by taking advantage of the fact that the blower blade 50 has a rotational symmetric shape formed by the blade portions 51 to 58 having the same shape. Accordingly, there is no need to change the machining program which demands extensive effort and time, and thus the machining amount of each of the blade portions 51 to 58 can be easily adjusted.

(2) According to the manufacturing apparatus 1, a less unbalanced blower blade 50 can be manufactured using a known machining device 20, such as a machining center. There is no need to use a machining jig which demands high dimensional accuracy and results in increased cost, and thus the manufacturing cost can be reduced.

(3) According to the manufacturing apparatus 1, it is determined whether or not the unbalance amount is within the allowable range before adjusting the machining amount of each of the blade portions 51 to 58. When the unbalance amount is within the allowable range, the balance correction process is not executed. Therefore, the balance correction process is executed only when needed, so that the productivity can be improved, and the cost reduction can be achieved.

(4) Even in the case where the balance of the blower blade 50 is further corrected by the balance correction device 40 in the post-process, the unbalance amount of the blower blade 50 manufactured according to the present embodiment is small, and thus an effort necessary for the balance correction can be reduced. In addition, if the balance accuracy required for the blower blade 50 is not so strict, the balance correction in the post-process can be omitted.

Effect of the Invention

The manufacturing apparatus and the manufacturing method including the above-described configuration do not need to change the machining program and do not require an expensive machining jig. Therefore, a less unbalanced blower blade can be manufactured easily and at low cost.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A manufacturing apparatus for manufacturing a blower blade in which a plurality of blade portions having a same shape are arranged around a rotation axis line, the manufacturing apparatus comprising:
    a machining device configured to perform cutting or grinding to machine the blower blade;
    a balance correction device provided independently from the machining device, configured to perform cutting or grinding to the machined blower blade cut or grinded by the machining device;
    a balance measurement device configured to measure at least one of an angle or a vibration of the blower blade to measure an unbalance of the blower blade; and
    a control device including a processor configured to control the machining device and the balance correction device,
    wherein the processor of the control device is configured to:
        control the machining device to cut or grind each of the blade portions of the blower blade a first time according to a first program trajectory and a machining parameter,
        determine a first unbalance of the blower blade by using at least one of a first angle or a first vibration measured by the balance measurement device,
        individually adjust a machining amount of the machining device by changing the machining parameter so that the machining device cuts or grinds each of the blade portions a second time by a second program trajectory geometrically similar to but shifted from the first program trajectory by an amount based on the machining parameter, based on data of the determined first unbalance of the blower blade, so as to reduce a first unbalance of the blower blade into a first range, and
        after the first unbalance of the blower blade has been reduced into a first range by the machining device cutting or grinding each of the blade portions the second time, determine a second unbalance of the blower blade by using at least one of a second angle or a second vibration measured by the balance measurement device, and control the balance correction device to cut or grind the blower blade so as to reduce the second unbalance of the blower blade into a second range smaller than the first range.

2. The manufacturing apparatus according to claim 1, wherein the processor individually adjusts the machining parameter to adjust the machining amount for each of the blade portions.

3. The manufacturing apparatus according to claim 2, wherein the machining parameter adjusted by the processor is a parameter associated with a tool length of the machining device.

4. The manufacturing apparatus according to claim 2, wherein the machining parameter adjusted by the processor is a parameter associated with a tool diameter of the machining device.

5. The manufacturing apparatus according to claim 2, wherein the machining parameter adjusted by the processor is a parameter associated with a program coordinate system.

6. The manufacturing apparatus according to claim 2, wherein the machining parameter adjusted by the processor is a parameter associated with a workpiece coordinate system.

7. A manufacturing apparatus for manufacturing a blower blade in which a plurality of blade portions having a same shape are arranged around a rotation axis line, the manufacturing apparatus comprising:
    a machining device configured to perform cutting or grinding to machine the blower blade;
    a balance correction device provided independently from the machining device, configured to perform cutting or grinding to machine the blower blade cut or grinded by the machining device;
    a balance measurement device configured to measure at least one of an angle or vibration of the blower blade to measure an unbalance of the blower blade; and
    a control device including a processor configured to control the machining device and the balance correction device,
    wherein the processor of the control device is configured to:
        control the machining device, a first time, according to a first program trajectory and a machining parameter, to cut or grind each of the blade portions of the blower blade while rotating the blower blade around the rotation axis line,
        determine a first unbalance of the blower blade by using at least one of a first angle or a first vibration measured by the balance measurement device,
        individually adjust a machining amount of the machining device by changing the machining parameter so that the machining device cuts or grinds each of the blade portions a second time by a second program trajectory geometrically similar to but shifted from the first program trajectory by an amount based on the machining parameter, based on data of the determined first unbalance of the blower blade, so as to reduce a first unbalance of the blower blade into a first range, and
        after the first unbalance of the blower blade has been reduced into a first range by the machining device cutting or grinding each of the blade portions the second time, determine a second unbalance of the blower blade by using at least one of a second angle or a second vibration measured by the balance measurement device, and control the balance correction device to cut or grind the blower blade so as to reduce the second unbalance of the blower blade into a second range smaller than the first range.

* * * * *